United States Patent
Hibino

(10) Patent No.: US 8,037,183 B2
(45) Date of Patent: Oct. 11, 2011

(54) PROCESSING METHOD AND APPARATUS FOR COMMUNICATION PATH LOAD DISTRIBUTION

(75) Inventor: Yoshihiko Hibino, Hashima-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1242 days.

(21) Appl. No.: 11/640,915

(22) Filed: Dec. 19, 2006

(65) Prior Publication Data

US 2007/0115804 A1 May 24, 2007

Related U.S. Application Data

(63) Continuation-in-part of application No. PCT/JP2005/009261, filed on May 20, 2005.

(30) Foreign Application Priority Data

Jul. 8, 2004 (JP) ................................. 2004-201720

(51) Int. Cl.
*G06F 15/173* (2006.01)
*G06F 15/16* (2006.01)
(52) U.S. Cl. ......................... 709/226; 709/234; 709/235
(58) Field of Classification Search .................. 709/226, 709/224, 229, 239, 241, 234, 235
See application file for complete search history.

(56) References Cited

U.S. PATENT DOCUMENTS

| 5,450,578 | A * | 9/1995 | Mackenthun ...................... 714/4 |
| 6,253,334 | B1 * | 6/2001 | Amdahl et al. .................... 714/4 |
| 7,219,300 | B2 * | 5/2007 | Arquie et al. ................. 715/736 |

(Continued)

FOREIGN PATENT DOCUMENTS

JP A 01-183761 7/1989

(Continued)

OTHER PUBLICATIONS

Minami, H. et al., "A Proposal of Node Selection Based on Proximity for Peer-to-Peer File Sharing Systems," *IPSG SIG Notes*, Feb. 6-7, 2002, pp. 3-9, vol. 2002, No. 11, published by Information Processing Society of Japan, Japan (with Abstract).

(Continued)

*Primary Examiner* — Kristie Shingles
(74) *Attorney, Agent, or Firm* — Oliff & Berridge, PLC

(57) ABSTRACT

It is the object of the present invention to provide a processing apparatus, processing method, processing program and recording medium capable of reducing the concentration of load upstream in the communication path of a network, and to improve the efficiency of a network system. A processing apparatus in a network system, which includes a plurality of processing apparatuses that are connected together via communication paths and in which identical data files are stored in the plurality of processing apparatuses, includes: a communication-load-information-acquisition means for acquiring communication-load information related to the communication loads of each of the communication paths between the one processing apparatus and each of the other processing apparatuses; a communication-load-comparison means for comparing the communication loads of each of the communication paths; a request-information-transmission means for sending request information based on the comparison results by the communication-load-comparison means to one of the other processing apparatuses, which is connected by the communication path for which the communication load is relatively small and which has the data file, requesting that specified data be sent; and a data-reception means for receiving the data that is sent from the other processing apparatus.

21 Claims, 11 Drawing Sheets

| COMMUNICATION-LOAD TABLE |
|---|
| NETWORK-TERMINAL TABLE FOR A RELAY NUMBER OF 1 |
| NETWORK-TERMINAL TABLE FOR A RELAY NUMBER OF 2 |
| NETWORK-TERMINAL TABLE FOR A RELAY NUMBER OF 3 |
| NETWORK-TERMINAL TABLE FOR A RELAY NUMBER OF 4 |
| NETWORK-TERMINAL TABLE FOR A RELAY NUMBER OF 5 |
| ⋮ |
| NETWORK-TERMINAL TABLE FOR A RELAY NUMBER OF Tmax |

NETWORK-TERMINAL TABLE FOR A RELAY NUMBER OF 1

| NETWORK-TERMINAL | DELAY TIME (msec) | BANDWIDTH (Mbps) | IP ADDRESS |
|---|---|---|---|
| NETWORK-TERMINAL APPARATUS 20 | 22 | 1.5 | 100.100.10.16 |
| NETWORK-TERMINAL APPARATUS 30 | 30 | 3.0 | 100.100.10.27 |
| NETWORK-TERMINAL APPARATUS 40 | 30 | 1.0 | 100.100.11.20 |
| NETWORK-TERMINAL APPARATUS 50 | 35 | 2.2 | 100.100.10.22 |

U.S. PATENT DOCUMENTS

| | | | |
|---|---|---|---|
| 2001/0052016 A1* | 12/2001 | Skene et al. | 709/226 |
| 2002/0101443 A1 | 8/2002 | Yamaguchi et al. | |
| 2002/0118389 A1 | 8/2002 | Fukuda et al. | |
| 2002/0152301 A1* | 10/2002 | Garrett et al. | 709/224 |
| 2002/0152318 A1 | 10/2002 | Menon et al. | |
| 2003/0016624 A1* | 1/2003 | Bare | 370/217 |
| 2003/0018978 A1 | 1/2003 | Singal et al. | |
| 2003/0101253 A1 | 5/2003 | Saito et al. | |
| 2003/0123424 A1* | 7/2003 | Jung | 370/338 |
| 2004/0024861 A1* | 2/2004 | Coughlin | 709/224 |
| 2005/0086363 A1* | 4/2005 | Ji | 709/235 |
| 2006/0106938 A1* | 5/2006 | Dini et al. | 709/228 |

FOREIGN PATENT DOCUMENTS

| | | |
|---|---|---|
| JP | A 03-102438 | 4/1991 |
| JP | A 08-314819 | 11/1996 |
| JP | A 09-305470 | 11/1997 |
| JP | A 10-320261 | 12/1998 |
| JP | B2 2943695 | 6/1999 |
| JP | A 2002-222112 | 8/2002 |
| JP | A 2002-259259 | 9/2002 |
| JP | A-2002-304338 | 10/2002 |
| JP | A 2002-324004 | 11/2002 |
| JP | A 2003-099337 | 4/2003 |
| JP | A 2003-169089 | 6/2003 |
| JP | A-2004-533738 | 11/2004 |
| WO | WO 02/071191 A2 | 9/2002 |

OTHER PUBLICATIONS

Gotou, Y. et al., "Replication Methods to Improve the Service Robustness in P2P Networks," *IEICE Technical Report*, Oct. 24, 2002, pp. 25-28, vol. 102, No. 409, The Institute of Electronics, Information and Communication Engineers (with Abstract).

Rowstron, A. et al., "Storage Management and Caching in PAST, a Large-Scale, Persistent Peer-to-Peer Storage Utility," *ACM SOSP*, Oct. 2001, pp. 2-14.

Japanese Office Action issued in Japanese Patent Application No. 2004-201720 on May 18, 2010 (wiht translation).

* cited by examiner

FIG. 3

| DATA FILE D45 |
|---|
| DATA FILE D35 |
| DATA FILE D63 |
| DATA FILE D55 |
| DATA FILE D4 |
| DATA FILE D26 |
| DATA FILE D13 |
| DATA FILE D11 |
| DATA FILE D1 |
| DATA FILE D34 |

← DATA FILES STORED IN THE DATA-FILE-MEMORY UNIT 11A

FIG. 4

NETWORK-TERMINAL TABLE FOR A RELAY NUMBER OF 1

| NETWORK-TERMINAL | DELAY TIME (msec) | BANDWIDTH (Mbps) | IP ADDRESS |
|---|---|---|---|
| NETWORK-TERMINAL APPARATUS 20 | 22 | 1.5 | 100.100.10.16 |
| NETWORK-TERMINAL APPARATUS 30 | 30 | 3.0 | 100.100.10.27 |
| NETWORK-TERMINAL APPARATUS 40 | 30 | 1.0 | 100.100.11.20 |
| NETWORK-TERMINAL APPARATUS 50 | 35 | 2.2 | 100.100.10.22 |

| COMMUNICATION-LOAD TABLE |
|---|
| NETWORK-TERMINAL TABLE FOR A RELAY NUMBER OF 1 |
| NETWORK-TERMINAL TABLE FOR A RELAY NUMBER OF 2 |
| NETWORK-TERMINAL TABLE FOR A RELAY NUMBER OF 3 |
| NETWORK-TERMINAL TABLE FOR A RELAY NUMBER OF 4 |
| NETWORK-TERMINAL TABLE FOR A RELAY NUMBER OF 5 |
| ... |
| NETWORK-TERMINAL TABLE FOR A RELAY NUMBER OF Tmax |

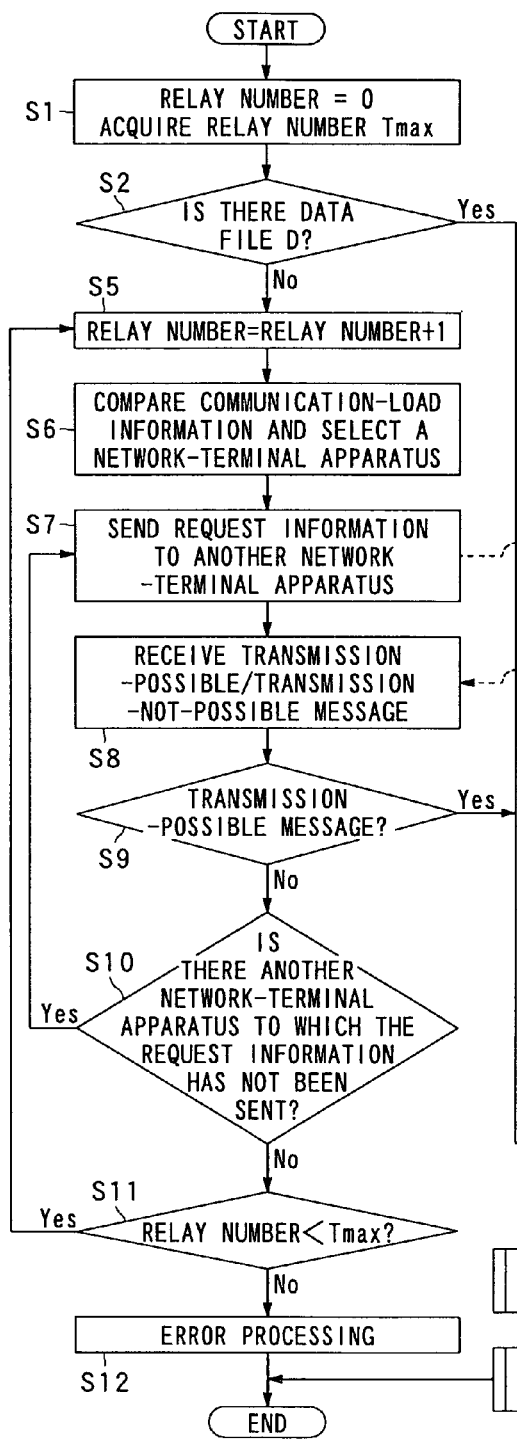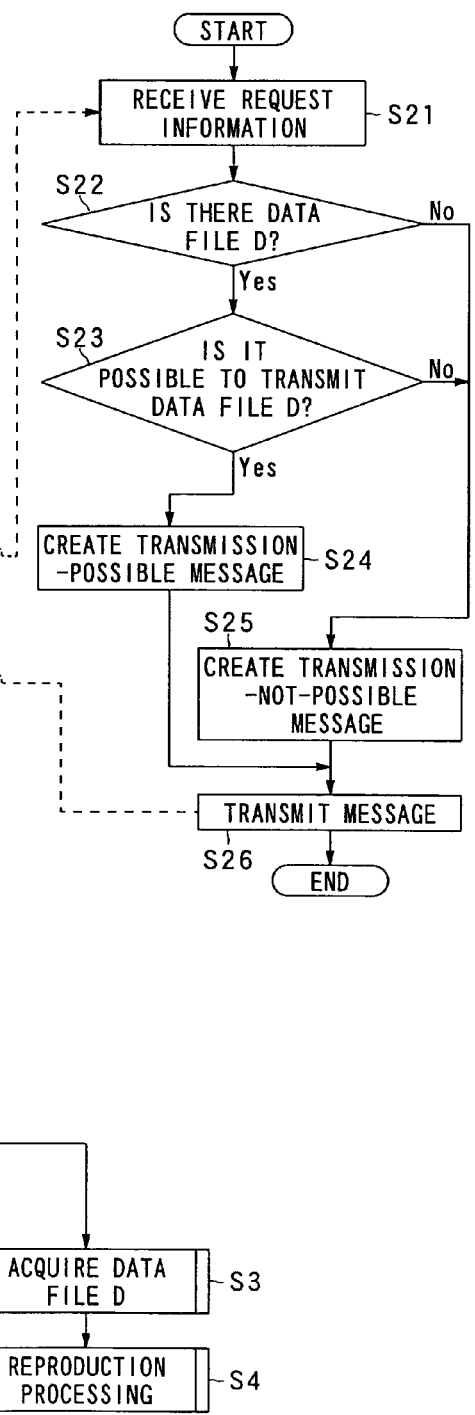

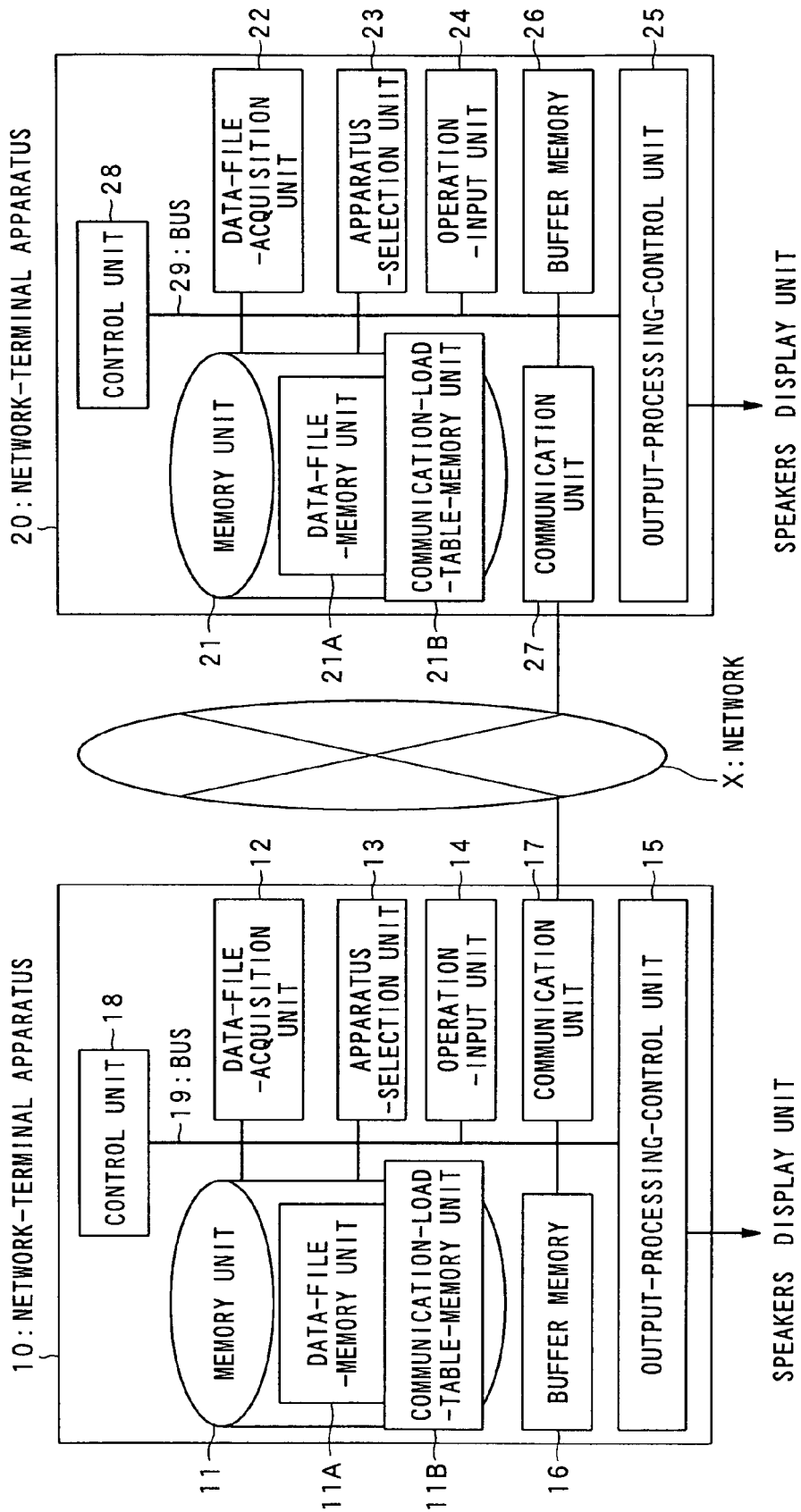

FIG.7A

| DATA FILE D42 |
| --- |
| DATA FILE D26 |
| DATA FILE D13 |
| DATA FILE D4 |
| DATA FILE D76 |
| DATA FILE D16 |
| DATA FILE D22 |
| DATA FILE D87 |
| DATA FILE D64 |
| DATA FILE D12 |

DATA FILES STORED IN NETWORK-TERMINAL APPARATUS 20

FIG.7B

| DATA FILE D21 |
| --- |
| DATA FILE D46 |
| DATA FILE D7 |
| DATA FILE D15 |
| DATA FILE D25 |
| DATA FILE D78 |
| DATA FILE D27 |
| DATA FILE D52 |
| DATA FILE D29 |
| DATA FILE D10 |

DATA FILES STORED IN NETWORK-TERMINAL APPARATUS 30

FIG.7C

| DATA FILE D1 |
| --- |
| DATA FILE D22 |
| DATA FILE D23 |
| DATA FILE D24 |
| DATA FILE D5 |
| DATA FILE D27 |
| DATA FILE D4 |
| DATA FILE D20 |
| DATA FILE D9 |
| DATA FILE D76 |

DATA FILES STORED IN NETWORK-TERMINAL APPARATUS 40

FIG.7D

| DATA FILE D2 |
| --- |
| DATA FILE D32 |
| DATA FILE D53 |
| DATA FILE D4 |
| DATA FILE D34 |
| DATA FILE D6 |
| DATA FILE D2 |
| DATA FILE D24 |
| DATA FILE D29 |
| DATA FILE D3 |

DATA FILES STORED IN NETWORK-TERMINAL APPARATUS 50

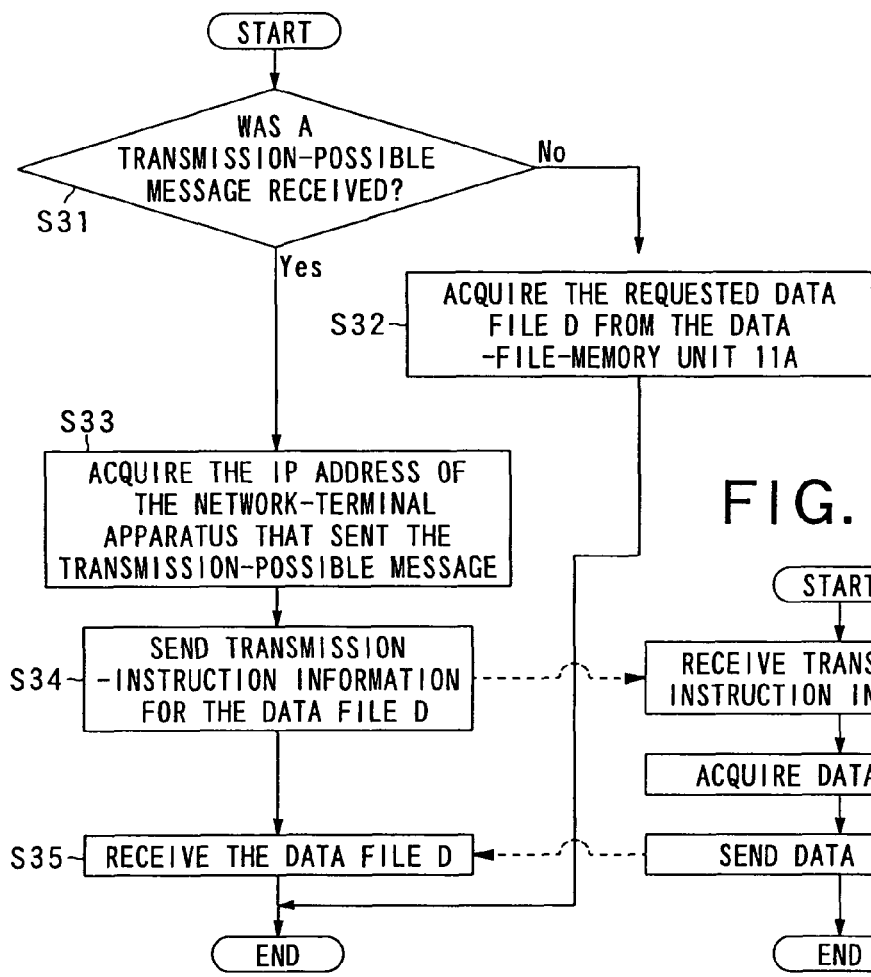

PROCESSING METHOD AND APPARATUS FOR COMMUNICATION PATH LOAD DISTRIBUTION

BACKGROUND OF THE INVENTION

1. Field of the Invention

The present invention relates to a distribution-management type computer network system or the like that distributes and stores shared files among a plurality of computers.

2. Discussion of the Related Art

An example of this kind of computer network system is the distribution-management type of network file system disclosed in patent document 1.

In this system, each computer has a management-information table, which stores management information necessary for better understanding the information of the shared files that are distributed in the memory areas of each of the computers, and compares the contents of the management-information table with those of only the computers that are connected by a relationship of referencing the contents of those management-information tables or having the contents of its own management-information table referenced, and rewrites the contents of the management-information table, then obtains a shared file from a target computer based on the management information in the management table, and in doing so is effective in making it possible to easily combine files, and to prevent having to concentrate access on one single computer.

[Patent Document] Japanese Patent Application 2002-324004

However, when this kind of distribution-management type of computer network system is applied to a broad IP (Internet Protocol) network, there is a problem in that generally the network load becomes increasingly larger in the direction going further upstream (high-order level) the communication path of the IP network (in other words, the frequency that an upstream IP router or communication line of the network is used increases).

SUMMARY OF THE INVENTION

Taking the aforementioned problem into consideration, it is the object of the present invention to provide a processing apparatus, processing method, processing program and recording medium capable of reducing the concentration of load upstream in the communication path of a network, and to improve the efficiency of a network system.

The present invention recited in claim 1 for solving the problems is directed to a processing apparatus in a network system, which includes a plurality of processing apparatuses that are connected together via communication paths and in which identical data files are stored in the plurality of processing apparatuses, including: a communication-load-information-acquisition means for acquiring communication-load information related to the communication loads of each of the communication paths between the one processing apparatus and each of the other processing apparatuses; a communication-load-comparison means for comparing the communication loads of each of the communication paths; a request-information-transmission means for sending request information based on the comparison results by the communication-load-comparison means to one of the other processing apparatuses, which is connected by the communication path for which the communication load is relatively small and which has the data file, requesting that specified data be sent; and a data-reception means for receiving the data that is sent from the other processing apparatus.

With the invention according to claim 1, the communication loads of each of the communication paths between one processing apparatus and each of the other processing apparatuses are compared, and based on the comparison results, data is acquired from one of the other processing apparatuses that has the requested data file and that is connected via a communication path having a relatively small communication load, so it is possible to reduce the concentration of loads upstream in the communication paths of the network, and thus it is possible to improve the operating efficiency of the system.

BRIEF DESCRIPTION OF THE DRAWINGS

FIG. 3 is a drawing explaining a communication-load-data table that is stored in a data-file memory unit 11A.

FIG. 4 is a drawing explaining a communication-load-data table that is stored in a communication-load-table memory unit 11B.

FIG. 5A is a flowchart showing the process of acquiring a data file by a control unit 18 of a network-terminal apparatus 10.

FIG. 5B is a flowchart showing the process of transmitting a data file by a control unit of another network-terminal apparatus.

FIG. 6 is a block diagram showing the construction of a network-terminal apparatus 10 and network-terminal apparatus 20.

FIG. 7A is a data file that is stored inside the network-terminal apparatus 20.

FIG. 7B is a data file that is stored inside the network-terminal apparatus 30.

FIG. 7C is a data file that is stored inside the network-terminal apparatus 40.

FIG. 7D is a data file that is stored inside the network-terminal apparatus 50.

FIG. 8A is a flowchart showing an acquisition process by the control unit 18 of the network-terminal apparatus 10.

FIG. 8B is a flowchart showing a transmission process by a control unit of another network-terminal apparatus.

Figure 1:
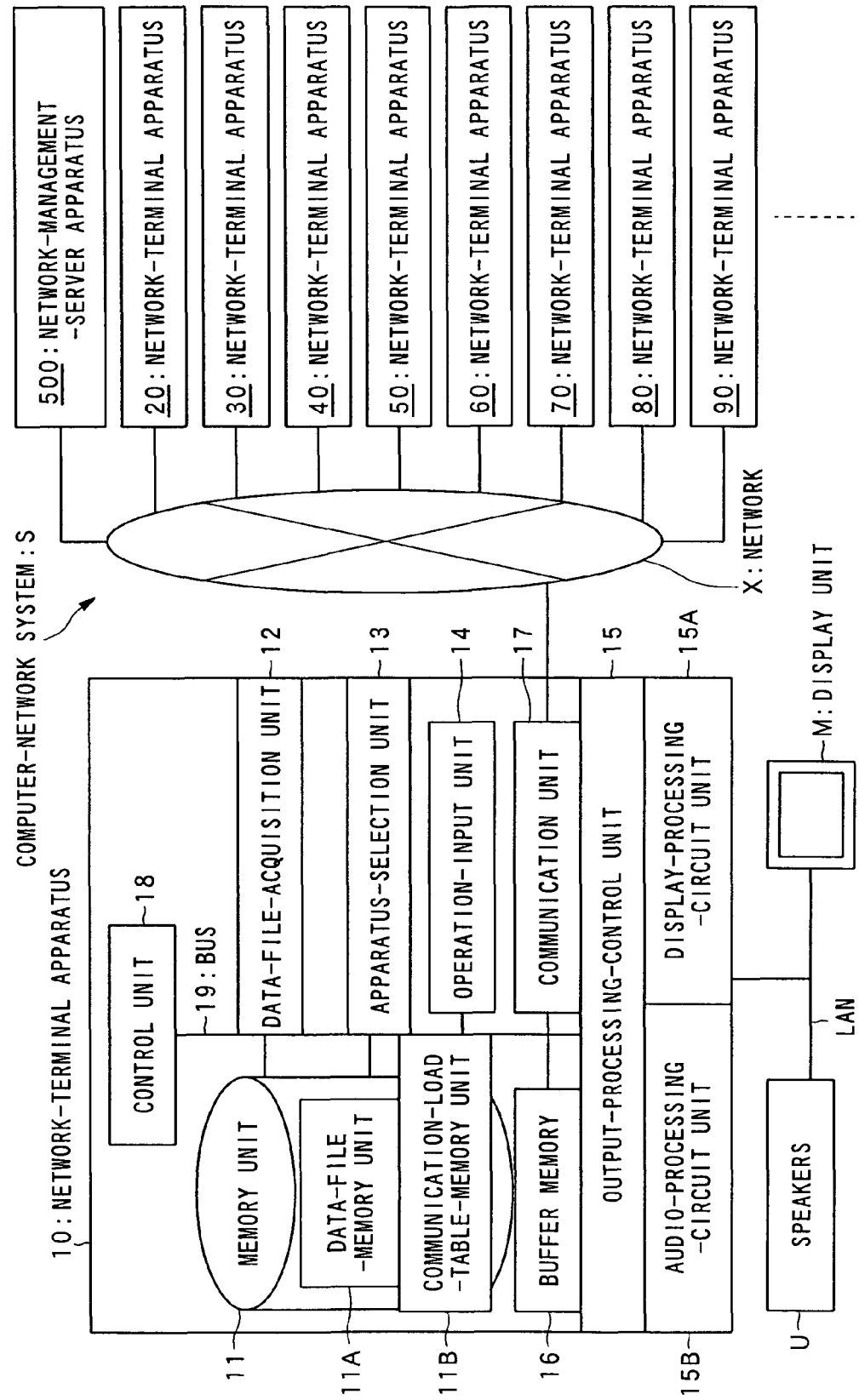
FIG. 1 is a block diagram showing the construction of a computer network system S.

EXPLANATION OF LETTERS OR NUMERALS 10, 20, 30, 40, 50, 60, 70, 80, 90 . . . Network-terminal apparatus
11, 21 . . . Memory unit
11A, 21A . . . Data-file-memory unit
11B, 21B . . . Communication-load-table-memory unit
12, 22 . . . Data-file-acquisition unit
13, 23 . . . Apparatus-selection unit
14, 24 . . . Operation-input unit
15, 25 . . . Output-processing-control unit
16, 26 . . . Buffer memory
17, 27 . . . Communication unit
18, 28 . . . Control unit
19, 29 . . . Bus
100, 101, 102, 200, 201 . . . IP router
300 . . . Communication paths
500 . . . Network-management-server apparatus
S . . . Computer network system
X . . . Network

DETAILED DESCRIPTION OF THE PREFERRED EMBODIMENTS

The preferred embodiment of the invention will be explained based on the drawings. The preferred embodiment described below is an embodiment in which the present invention is applied to a computer network system.

[Construction and Function of a Computer Network System]

First, the construction and function of a computer network system S of the preferred embodiment of the invention will be explained with reference to FIG. 1 and FIG. 2.

Figure 2:
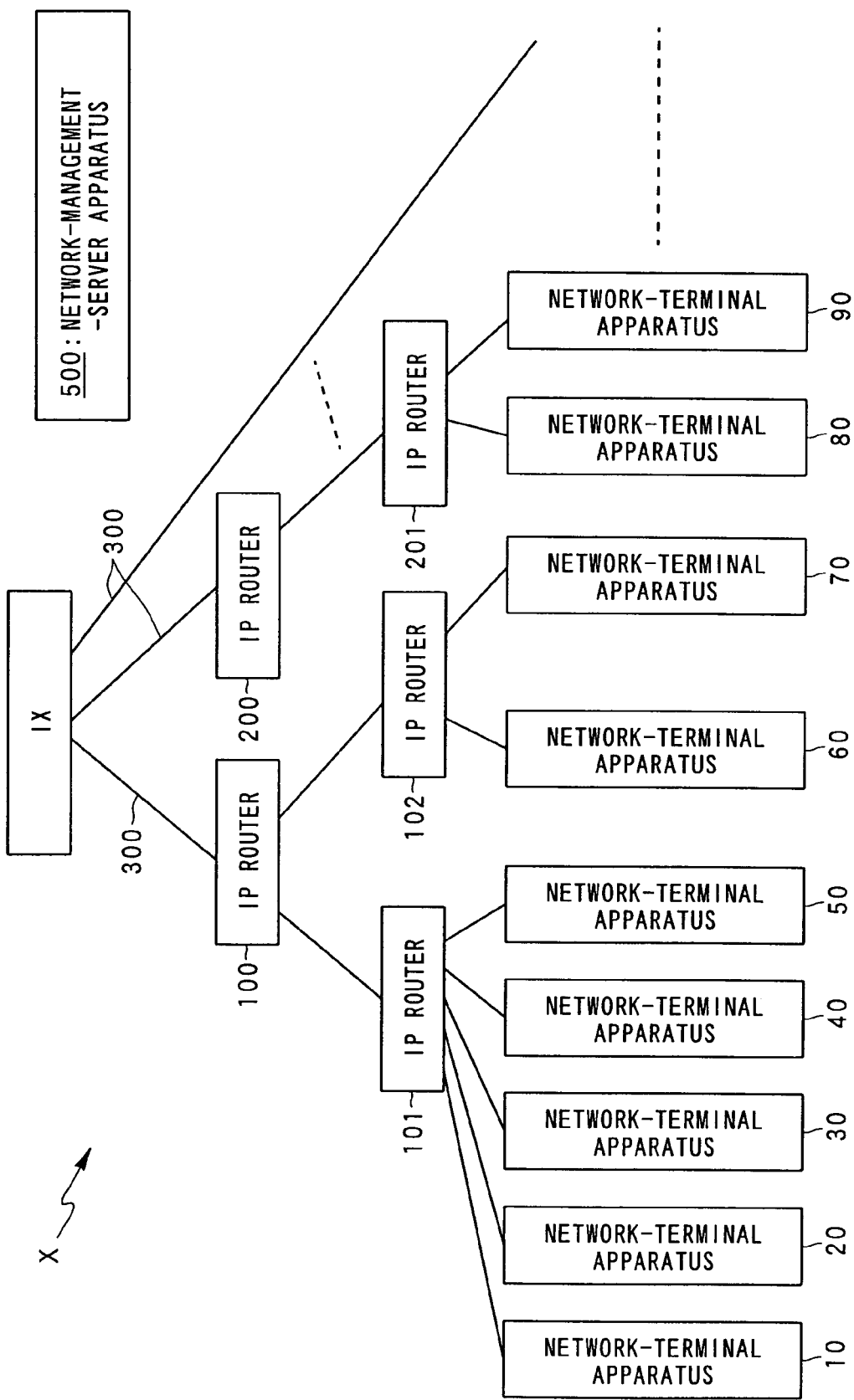
FIG. 2 is a drawing explaining the tree-structure of the computer network system S.

FIG. 1 is a block diagram showing the construction of the computer network system S, and FIG. 2 is a drawing showing and explaining the connected state of each of the network terminal apparatuses of the computer network system of this embodiment.

As shown in FIG. 1, the computer network system S of this embodiment is constructed so that it comprises network-terminal apparatuses 10, 20, 30, 40, 50, 60, 70, 80 and 90 as the processing apparatuses of the present invention.

Also, these network-terminal apparatuses 10 to 90 are such that they can access each other using telephone lines, fiber optic cables or the like via a network X that is created from a mobile communication network or the Internet. As shown in FIG. 2, this network X comprises: an IX (Internet Exchange), IP routers 100, 101, 102, 200 and 201 as a plurality of relay apparatuses, and a plurality of communication paths 300 for connecting these.

Moreover, in this embodiment, setting and managing the connected state between each of the network-terminal apparatuses of the computer network system S is performed by a network-management-server apparatus 500.

[Construction and Function of a Network-Terminal Apparatus]

Next, the construction and function of the network-terminal apparatus 10 will be explained.

The network-terminal apparatus 10 is an apparatus such as an audio visual apparatus (hereafter referred to simply as an AV apparatus) that comprises mainly a computer (for example a DVD (Digital Versatile Disc) player, set-top box, or the like), and is constructed so that the audio or video that is reproduced and processed by the network-terminal apparatus 10 is output from externally connected speakers U that output audio, or a display unit M such as a monitor or display for reproducing video.

The network-terminal apparatus 10 comprises: a memory unit 11 that has a data-file-memory unit 11A as a data-memory means that shares audio data files and video data files among terminals, and a communication-load-table-memory unit 11B that has a communication-load table that indicates communication-load information between that network-terminal apparatus 10 and other network-terminal apparatuses; a data-file-acquisition unit 12 that reads various data from the data-file-memory unit 11A; an apparatus-selection unit 13 that references the communication-load table that is stored in the communication-load-table-memory unit 11B and selects a network-terminal apparatus; a control-input unit 14 that is used by the user when performing various settings and when inputting a command to the network-terminal apparatus 10; an output-processing-control unit 15 that has a display-processing circuit 15A that uses a buffer memory 16 and controls a display unit M such as a monitor or the like that is located outside of the apparatus, and an audio-processing circuit 15B that converts audio data or music data of the contents to an audio signal for output; a communication unit 17 the performs communication with another network-terminal apparatus via the Internet; and a control unit 18 that controls the overall terminal apparatus; and where each of the components is connected together via a bus 19.

The network-terminal apparatuses 20 to 90 of the computer network system S also comprise the same components as the network-terminal apparatus 10.

First, the memory unit 11 comprises an external-memory apparatus such as a magnetic disc drive, and here, as shown in the figures, comprises a data-file-memory unit 11A, and a communication-load-table-memory unit 11B.

As shown in FIG. 3, the data-file-memory unit 11A stores data files D that are shared by the other network-terminal apparatuses 10 to 90 that are connected to the computer network system S. In the example shown in FIG. 3, the data-file-memory unit 11A of that network-terminal apparatus 10 stores ten data files D; data file D45, data file D35, data file D63, data file D55, data file D4, data file D26, data file D13, data file D1, data file D1 and data file D34.

The data files D are audio data files and/or video data files; for example, and data files are stored in the data-file-memory unit 11A by mounting a CD or a DVD in a loading unit (not shown in the figure) equipped in the network-terminal apparatus 10, and installing (storing) a data file in the data-file-memory unit 11A, or downloading a data file that is distributed over the network and storing it in the data-file-memory unit 11A.

Also, when the user operates the control-input unit 14 and the network-terminal apparatus 10 receives a reproduce-and-output-instruction signal that gives an instruction to reproduce and output a desired data file D, the network-terminal apparatus 10 searches all of the data files D stored in that data-file-memory unit 11A for the requested data file D, and when the requested data file D exists, the data-file-acquisition unit 12 acquires that data file D, and that data file D is reproduced and output by the display unit M or speakers U.

Also, when request information is received from a network-terminal apparatus 20 to 90 via the network X requesting that a desired data file D be sent, the data-file-acquisition unit 12 acquires the requested data file D from the data files D that are stored in that data-file-memory unit 11A, and that data file D is sent to the network-terminal apparatus 20 to 90 that sent the request information.

In the acquisition process of acquiring a data file D that will be described in detail later, a method is explained in which when request information requesting a desired data file D is sent from the network-terminal apparatus 10 via the communication unit 18 to one of the network-terminal apparatuses 20 to 90, the desired data file D is acquired from the data-file-memory unit that is located in that other network-terminal apparatus similar to network-terminal apparatus 10, and the acquired data file D is received.

Even though the various information attached to the data file D such as the attached header or search conditions differ, the data file D is acquired as the desired data file D as long as the contents are the same as those of the data file D requested by the user who operated the control-input unit 14.

The communication-load table explained in FIG. 4 is registered in the communication-load-table-memory unit 11B. Information related to the communication loads of each of the communications paths when performing communication from the network-terminal apparatus 10 to all of the other network-terminal apparatuses 20 to 90 is stored in this communication-load table.

More specifically, the communication-load table correlates information related to the communication loads of the network-terminal apparatuses 20 to 90 with the IP addresses of the other network-terminal apparatuses included in the computer network system S for each number of IP routers (hereafter referred to as the number of relays) in the communication paths between the network-terminal apparatus 10 and the network-terminal apparatuses 20 to 90.

In this embodiment, the communication load is determined according to Equation 1 below based on the number of relays in the communication path, delay time (msec), which is the length of the delay time in the communication path, and the effective bandwidth (Mbps) of the communication path.

$$\text{Communication load} = \text{Number of relays} \times X + (\text{Delay time}/\text{Reference time}) \times Y + (\text{Reference bandwidth}/\text{Effective bandwidth}) \times Z \quad (1)$$

Here, the reference time is a delay time (msec) that is used as a reference, for example it can be 50 msec. Also, the reference bandwidth is an effective bandwidth (Mbps) that is used as a reference, for example it can be 2 Mbps. Furthermore, X, Y and Z indicate weightings (ratios that indicate weightings) that are applied to the number of relays, the delay time and effective bandwidth, respectively; for example they can be $X=0.5$, $Y=0.2$, and $Z=0.25$; and by making the weighting applied to the number of relays the greatest, the communication load becomes more accurate and easier to use.

The number of relays, which is an important element for determining the communication load, is explained in FIG. 2.

In the figure, in the case of network-terminal 20, the IP router in the communication path from the network-terminal apparatus 10 is only IP router 101, so the network-terminal apparatus 20 belongs to the network-terminal apparatuses for with the number of relays is one.

Also, similarly, in the case of the network-terminal apparatuses 30 to 50, since the IP router in the communication path from the network-terminal apparatus 10 is only IP router 101, the network-terminal apparatuses 30 to 50 also belong to the network-terminal apparatuses for which the number of relays is one.

Moreover, in the case of network-terminal apparatus 60, the IP routers in the communication path from network-terminal apparatus 10 are the three IP routers, IP router 101, IP router 100 and IP router 103, so network-terminal apparatus 60 belongs to the network-terminal apparatuses for which the number of relays is three.

Also, similarly, in the case of network-terminal apparatus 70, since the IP routers in the communication path from network-terminal apparatus 10 are the three IP routers, IP router 101, IP router 100 and IP router 103, the network-terminal apparatus 70 also belongs to the network-terminal apparatuses for which the number of relays is three.

In the case of the network-terminal apparatuses 80 and 90, the IP routers in the communication path from the network-terminal apparatus 10 are the four IP routers, IP router 101, IP router 100, IP router 200 and IP router 201, so the network-terminal apparatuses 80 and 90 belong to the network-terminal apparatuses for which the number of relays is four.

Also, for each number of relays, the communication-load table correlates and stores the delay time (msec), bandwidth (Mbps), and IP address information for that network-terminal apparatus, which are other elements that are used in determining the communication load of the network-terminal apparatus. For example, the delay times (msec), bandwidths (Mbps) and IP addresses of the network-terminal apparatuses 20 to 50, for which the number of relays is one, are stored in the network-terminal table for which the number of relays is one.

A network-management-server apparatus 500 monitors the connection state of the network-terminal apparatuses of the computer-network system S, so when a network-terminal apparatus newly joins the computer-network system S, the network-management-server apparatus 500 sends topology information to each of the network-terminal apparatuses. Also, based on the topology information that was sent from the network-management-server apparatus 500, the network-terminal apparatuses update/create the aforementioned communication-load table.

When doing this, construction can be such that at a specified time, each of the network-terminal apparatuses periodically requests the network-management-server apparatus 500 to send the aforementioned topology information. When there is a request from a network-terminal apparatus for topology information, the network-management-server apparatus 500 sends the apparatus ID number that is uniquely assigned to each of the apparatuses, the IP addresses, and number of relays as topology information.

Also, based on the received topology information, the network-terminal apparatus creates a terminal table inside the communication-load table 11B for each number of relays, and based on the IP addresses of the received topology information, sends out timing signals and measures the delay times (msec) as the length of the delay in the communication paths between it and the network-terminal apparatuses having those IP addresses. Also, the network-terminal apparatus stores the measurement results as the delay times (msec) in the terminal tables for each number of relays. Moreover, the bandwidths (effective bandwidths: Mbps) are acquired based on reports from each of the network-terminal apparatuses and stored for example, or are calculated based on the delay times (msec) and stored.

The communication-load table is created by the method explained above.

When the user operates the control-input unit 14 and the data-file-acquisition unit 12 receives an reproduce-and-output instruction that gives an instruction to reproduce and output a desired data file D, the data-file-acquisition unit 12 acquires the requested data file D from the data files D that are stored in the data-file-memory unit 11A of the memory unit 11. Also, the acquired data file D is processed for output according to control from a display-processing circuit 15A and/or audio-processing circuit 15B inside an output-processing-control unit 15, and it is output by the display unit M and/or speakers U.

Furthermore, even when request information requesting that a desired data file D be sent from a network-terminal apparatus 20 to 90 via the network X, the data-file-acquisition unit 12 acquires the requested data file D from the data files D stored in the data-file-memory unit 11A of the memory unit 11, and via the communication unit 17, sends that data file D to the network-terminal apparatus 20 to 90 that sent the request information.

Also, when the desired data file D does not exist in the data-file-memory unit 11A of the memory unit 11, the data-file-acquisition apparatus 12 references the communication-load table, and sends request information via the communication unit 17 to one of the network-terminal apparatuses 20 to 90 requesting that the desired data-file D be sent. Moreover, the acquired data file D is processed for output according to control from a display-processing circuit 15A and/or audio-processing circuit 15B inside an output-processing-control unit 15, and it is output by the display unit M and/or speakers U. The processing method of acquiring a desired data file from the data files stored in one of the network-terminal apparatuses 20 to 90 will be explained later.

When the desired data file D to be reproduced and output is not stored in the data-file-memory unit 11A of the memory unit 11, then by the user operating the control-input unit 14, the apparatus-selection unit 13 references the communication-load table that is stored in the communication-load-table-memory unit 11*b* of the memory unit 11, and selects a network-terminal apparatus. More specifically, when a desired data file D to be reproduced and output is not stored in the data-file-memory unit 11A, the apparatus-selection unit 13 selects the network-terminal apparatus from among the network-terminal apparatuses 20 to 90 having the smallest communication load.

For example, according to the communication-load table shown in FIG. 4, first, the network-terminal table for which the number of relays is one is selected, and the apparatus-selection unit 13 selects the network-terminal apparatus 20 having the shortest delay time (22 msec) from the network-terminal table for which the number of relays is one. The process for apparatus selection will be described in detail later.

The control-input unit 14 comprises a remote controller and control buttons, and the user operates the control-input unit 14 in order to request that a desired data file D be reproduced and output.

The output-processing-control unit 15 comprises a display-processing-circuit unit 15A and an audio-processing-circuit unit 15B, and it creates video data or audio data based on a data file D acquired by the data-file-acquisition unit 12, then supplies that data to the external display unit M or speakers U of the network-terminal apparatus 10.

More specifically, the display-processing-circuit unit 15A is constructed so that based on the data file (video data file) acquired by the data-file-acquisition unit 12*k*, and according to an instruction from the control unit 19, it creates video data to be displayed by the display unit M, and temporarily stores that data in a buffer memory 16, and at specified timing, reads that video data to be displayed from the buffer memory 16 and outputs it to the display unit M that comprises a monitor or the like for displaying video.

The audio-processing-circuit unit 15B is constructed so that based on the data file (audio file) acquired by the data-file-acquisition unit 12, and according to an instruction from the control unit 19, it creates an audio signal to be output, and amplifies that signal by way of the speakers U.

The communication unit 17 is for performing communication between the network-terminal apparatuses 20 to 90 via the network X. This communication unit 17 comprises various communication functions such as packet processing, UDP processing, data-link processing, and physical-layer processing. Sending and receiving of data files D and various information is performed with the network-terminal apparatus 20 via the communication unit 17.

The control unit 18 comprises a CPU (Central Processing Unit) (not shown in the figures), work-area RAM (Random Access Memory), ROM (Read Only Memory) for storing various control programs and data such as processing programs, and an oscillation circuit, and based on an operation signal from the operation unit (not shown in the figures), creates control information for controlling all of the components in order to realize the operation corresponding to the operation information included in that operation signal, and outputs that control information via the bus 19 to the appropriate components in order to perform overall control of the operation of each of the components. More specifically, the control unit 18 includes various input/output ports such as a key-input port and a control port for the display-unit M, and is such that it performs overall control of all of the functions for processing. Also, by executing programs stored in ROM, the control unit 18 functions as the communication-load-information-acquisition means, communication-load-comparison means and request-information-transmission means of the present invention.

[Data-File Acquisition Operation]

Next, the data-file-acquisition process of this embodiment will be explained in detail.

First, the process of acquiring a data file that is stored in another network-terminal apparatus from the network-terminal apparatus 10 will be explained using FIG. 1 to FIG. 8.

FIG. 5A is a flowchart showing the data-file-acquisition process by the control unit 18 of the network-terminal apparatus 10, and the process that is shown in that flowchart is executed according to control from the control unit 18 based on a processing program that is stored beforehand in ROM (not shown in the figures) of the control unit 18.

FIG. 5B is a flowchart showing the data-file-sending process performed by the control unit in the network-terminal apparatus 20 to 90 that was requested by the network-terminal apparatus 10 to send a data file D.

Also, FIG. 6 is a block diagram showing the construction of the network-terminal apparatus 10 and the network-terminal apparatus 20 that was requested by that network-terminal apparatus 10 to send the data file D.

The construction of the network-terminal apparatus 20 shown in FIG. 6 is a simplification of that explained in FIG. 1 for explaining the data-file-acquisition process, where the memory unit 21, data-file-memory unit 21A, communication-load-table-memory unit 21B, data-file-acquisition unit 22, apparatus-selection unit 23, control-input unit 24, output-processing-control unit 25, buffer memory 26, communication unit 27, control unit 28 and bus 29 each have the same functions of those of the network-terminal apparatus 10 described above.

The process shown in FIG. 5A starts after the user operates the operation-input unit 14, the data file D to be reproduced and output is input, a reproduce-and-output-instruction signal is created by control from the control unit 18, and the created reproduce-and-output-instruction signal is acquired by the data-file-acquisition unit 12.

First, after receiving the reproduce-and-output signal, the data-file-acquisition unit 12 stores '0' in the RAM (not shown in the figures) of the control unit 18 as the number of relays, and obtains the maximum number of relays Tmax in the communication-load table stored in the communication-load-table-memory unit 11B (step S1). Also, the data-file-acquisition unit 12 determines whether or not the requested data file D exists in the data files D that are stored in the data-file-memory unit 11A (step S2).

Also, when it is determined that the requested data file D exists in the data-file-memory unit 11A (step S2: Yes), processing moves to the acquisition process for acquiring the data file D (step S3).

For example, in the example shown in FIG. 3, when the requested data file D is data file 45, the data-file-acquisition unit 12 acquires data file 45 from the data-file-memory unit 11A (step S3), then performs output processing based on control from the display-processing-circuit unit 15A and/or audio-processing-circuit unit 15B of the output-processing-control unit 15, and the data file D is reproduced by display unit M and/or speakers U (step S4). The acquisition process for acquiring the data file D (step S3) will be explained later using a flowchart.

On the other hand, in the process of step S2, when it is determined that the requested data file D does not exist in the data-file-memory unit 11A (step S2: No), '1' is added to the number of relays stored in the RAM (not shown in the figures) of the control unit 18 (step S5).

Also, the apparatus-selection unit 13 references the communication-load table that is stored in the communication-load-table-memory unit 11B of the memory unit 11, and selects the network-terminal table for the number of relays that corresponds to that number of relays. Also, by acquiring communication-load information other than the number of relays of other network-terminal apparatuses that is included in the network-terminal table for that number of relays (by the communication-load-information-acquisition means) and performing comparison (by the communication-load-comparison means), the apparatus-selection unit 13 selects a network-terminal apparatus (step S6).

For example, in the communication-load table TB shown in FIG. 3, when the network-terminal table for which the number of relays is one is selected, the apparatus-selection unit 13 selects network-terminal apparatus 20 from among the network-terminal apparatuses 20, 30, 40 and 50 that are included in the network-terminal table for one relay because it has the minimum delay time (22 msec).

The process will continue to be explained up to step S26 assuming that network-terminal apparatus 20 was selected by the apparatus-selection unit 13 in step S6 described above, The IP address of network-terminal apparatus 20 that was selected in step S6 is acquired by referencing the communication-load-table-memory unit 11B, and request information is sent to the IP address [100. 100. 10. 16] of network-terminal apparatus 20 requesting that the data file D requested above be sent (step S7).

Moreover, in the processing by the other network-terminal apparatus shown in FIG. 5B, when network-terminal apparatus 20 receives the request information that was sent from network-terminal apparatus 10 in the process of step S7 via the network X (step S21), the network-terminal apparatus 20 determines according to control from the control unit 28 whether or not the requested data file D exists in the data files D that are stored in the data-file-memory unit 21A of that network-terminal apparatus 20 (step S22).

Also, when it is determined that the requested data file D exists in the data-file-memory unit 21A (step S22: Yes), then the network-terminal apparatus 20 determines whether or not it is possible to send the requested data file D (step S23).

For example, when it is not possible to send the requested data file D such as in the case when the requested data file D is in the progress of being sent to a different network-terminal apparatus 30 to 90 in the computer network system S other than network-terminal apparatus 10, or when the processing capability of the control unit 28 or the like of the network-terminal apparatus 20 is low, or when the communication bandwidth of the network X via the communication unit 37 is narrow (step S23: No), then according to control from the control unit 28, the network-terminal apparatus 20 creates a transmission-not-possible message that indicates that the data file D cannot be sent (step S25), and when it is possible to send the requested data file D (step S23: Yes), then according to control from the control unit 28, the network-terminal apparatus 20 creates a transmission-possible message that indicates that the data file D can be sent (step S24).

On the other hand, in the process of step S22, when it is determined that the requested data file D does not exist in the data-file-memory unit 21A (step S22: No), then according to control from the control unit 28, the network-terminal apparatus 20 creates a transmission-not-possible message that indicates that the data file D cannot be sent (step S25).

Also, the network-terminal apparatus 20 sends the transmission-possible message (or transmission-not-possible) message that was created in step S24 or step S25 to network-terminal apparatus 10 via the communication unit 27 (step S26).

Next, in the processing by the network-terminal apparatus 10 shown in FIG. 5A, the communication unit 17 receives the message that was sent from the other network-terminal apparatus in the processing of step S26 (step S28).

Also, the network-terminal apparatus 10 determines whether or not the received message is a transmission-possible message (step S9), and when it is a transmission-possible message (step S9: Yes), processing moves to the process of acquiring and reproducing the data file D (step S3). The acquisition process of acquiring the data file (step S3) will be explained in detail later using a flowchart.

On the other hand, when the message that was received in step S8 is not a transmission-possible message, or in other words, when the message is a transmission-not-possible message (step S9: No), the network-terminal apparatus 10 determines whether or not there is a network-terminal apparatus in the network-terminal table TB for the current number of relays to which request information for the data file D has not yet been sent (step S10), and when there is a network-terminal apparatus to which the request information for the data file D has not yet been sent (step S10: Yes), processing moves to step S6 and processing from step S6 to step S9 is repeated. On the other hand, when the request information for data file D has already been sent to all of the network-terminal apparatuses in the network-terminal table TB for the current number of relays, and there is no network-terminal apparatus to which the request information has not been sent (step S10: No), processing moves to step S11.

The network-terminal apparatus 10 then determines whether or not the current number of relays is less than the maximum number of relays Tmax that was obtained in step S1 (step S11), and when the current number of relays is less than the maximum number of relays Tmax, processing moves to step S5, and processing from step S5 to step S11 is repeated (step S11: Yes).

In other words, request information for the data file D is sent to all of the other network-terminal apparatuses stored in the communication-load-table-memory unit 11B in the order of network terminals having the smallest communication load until the requested data file D is found.

On the other hand, when the current number of relays is less than the maximum number of relays Tmax (step S11: No), error processing is performed and processing ends (step S12). In this case, even though the request information has been sent to all of the network-terminal apparatuses, there is no network-terminal apparatus that is capable of sending the requested data file D, so according to control from the control unit 18, the network-terminal apparatus 10 creates an error message indicating that the requested data file D could not be found, and displays that error message on the display unit M, or, together with displaying an error message 'Data File D does not exist', outputs an alarm from the speakers U.

Here, the figures will be used in order to explain in more detail the order for searching the data files D in the network-terminal apparatuses.

FIGS. 7A to 7D show the data files that are stored in each of the network-terminal apparatuses for which the number of relays is one, where FIG. 7A shows the data files that are stored in network-terminal apparatus 20, FIG. 7B shows the data files that are stored in network-terminal apparatus 30, FIG. 7C shows the data files that are stored in network-terminal apparatus 40, and FIG. 7D shows data files that are stored in network-terminal apparatus 50.

For example, in the processing of step S6 described above, the apparatus-selection unit 13 first selects network-terminal apparatus 20 as the network-terminal apparatus among the network-terminal apparatuses for which the number of relays is one with the smallest communication load.

Also, when the requested data file D is data file D42, for example, then in the processing of step S22 described above, it is found that the requested data file D42 exists in the data files stored in network-terminal apparatus 20 (see FIG. 7A).

On the other hand, in the case where the requested data file D is data file D7, then in the processing of step S22 described above, it is determined that the requested data file D7 does not exist in network-terminal apparatus 20, so network-terminal apparatus 10 receives a transmission-not-possible message (step S25, step S26, step S18).

Also, the apparatus-selection unit 13 then selects network-terminal apparatus 30 from among the other network-terminal apparatuses 30, 40 and 50 for which the number of relays is one and to which request information has not yet been sent as the network-terminal apparatus having the smallest communication load, and the processing of step S6 to step S10 is repeated until the requested data file D is found. In the processing of step S22 described above, it is found that the requested data file D7 is a data file that is stored in network-terminal apparatus 30 (see FIG. 7B), so network-terminal apparatus 10 receives a transmission-possible message that is sent from network-terminal apparatus 30 (step S24, step S26, step S18).

On the other hand, in the case where the requested data file D is data file 92, that data file 92 is not stored in any of the network-terminal apparatuses for which the number of relays is one, so next it is searched for in the network-terminal apparatuses for which the number of relays is two. In this way, the processing of step S5 to step S11 is repeatedly performed for the other network-terminal apparatuses 60 to 90 in the order for when the number of relays is three, four and then five until the requested data file 92 is found.

[Data File D Acquisition Process]

Next, the operation for acquiring the data file D in the processing of step S3 described above will be explained.

FIG. 8A is a flowchart showing the data-file-acquisition process that is performed by the control unit 18 of the network-terminal apparatus 10, and the processing shown in this flowchart is executed based on control from the control unit 18 according to a processing program that is stored beforehand in ROM (not shown in the figures) in the control unit 18.

Also, FIG. 8B is a flowchart showing the data-file-transmission process performed by the control unit of a network-terminal apparatus 20 to 90 that was requested from the network-terminal apparatus 10 to send the requested data file D.

First, in step S2 described above, when it is determined that the requested data file D exists in the data files D stored in the data-file-memory unit 11A, or when in step S9 a transmission-possible message is received from another network-terminal apparatus, the network-terminal apparatus 10 determines whether or not the transmission-possible message has been received (step S31). In other words, the network-terminal apparatus 10 determines whether it found the requested data file D in its own data-file-memory unit 11A (step S2), or whether it found the requested data file D in another network-terminal apparatus (step S9).

Also, when it is determined that a transmission-possible message has not been received (step S31: No), then the network-terminal apparatus 10 has found the data file D requested in step S2 in its own data-file-memory unit 11A, so the data-file-acquisition unit 12 acquires the requested data file D from the data-file-memory unit 11A (step S32), and processing ends.

On the other hand, in the determination of step S31, when a transmission-possible message is received (step S31: Yes), the IP address of the other network-terminal apparatus that sent the transmission-possible message is referenced and acquired from the communication-load table TB (step S33), and the network-terminal apparatus 10 sends transmission-instruction information via the communication unit 17 to that IP address requesting that the data file D be sent (step S34).

Also, in the other network-terminal apparatus, after transmission-instruction information has been received from the network-terminal apparatus 10 (step S41), the other network-terminal apparatus acquires the data file D that is stored inside the other network-terminal apparatus (step S42) and sends it to network-terminal apparatus 10 (step S43). More specifically, when the other network-terminal apparatus is network-terminal apparatus 20, it acquires the data file D from the data-file-memory unit 21A and sends the data file D to network-terminal apparatus 10 via the communication unit 27.

The network-terminal 10 receives the data file D from the other network-terminal apparatus (step S35), and processing ends.

As explained above, when the data file D, which was requested by the user operating the operation-input unit 14, does not exist in the data-file-memory unit 11A, network-terminal apparatus 10 references the communication-load table that is stored in the communication-load-table-memory unit 11B and requests the data file D in order from the network-terminal apparatus having the smallest communication load, or in other words, in order from the network-terminal apparatuses 20 to 50 for which the number of relays is one, and furthermore, even among the network-terminal apparatuses for which the number of relays is one, requests the data file D in order of the smallest delay time (msec), and even furthermore, in order of largest bandwidth (Mbps), and inquires whether or not the data file D exists and whether or not transmission is possible.

With this kind of data-file-acquisition method, when the network-terminal apparatus 10 has another network-terminal apparatus 20 to 90 included in a computer-network system S send a desired data file D, it is possible for the network-terminal apparatus 10 to have the data file D sent first from a network-terminal apparatus whose communication load on the communication path is relatively small. Therefore, when sending and receiving data files D between network-terminal apparatuses, it is possible to prevent an increase in the load on a certain network-terminal apparatus or server, and thus it becomes possible to provide a network system having high reliability without causing bias in the communication load of the entire computer-network system S.

[Saving the Data File in Memory]

Next, the process in this embodiment of saving a data file in memory will be explained.

The process of saving a data file in memory that will be explained in detail below using the drawings is a process of saving a copy of an acquired data file D in the data-file-memory unit 11A of the network-terminal apparatus 10 when the data file D that was acquired in the data-file-acquisition process described above is a data file D that was acquired from a network-terminal apparatus whose communication load with the network-terminal apparatus 10 is greater than a certain communication load. Also, at this time, when there is not enough storage space in the data-file-memory unit 11A of the network-terminal apparatus 10 to store the data file D, this process stores a copy of the acquired data file D in a network-terminal apparatus whose communication load with the network-terminal apparatus 10 is smaller than a certain communication load.

The process of saving a copy of a data file D that was acquired in the data-file-acquisition process will be explained with reference to FIGS. 9A to 9C.

Figure 9A:
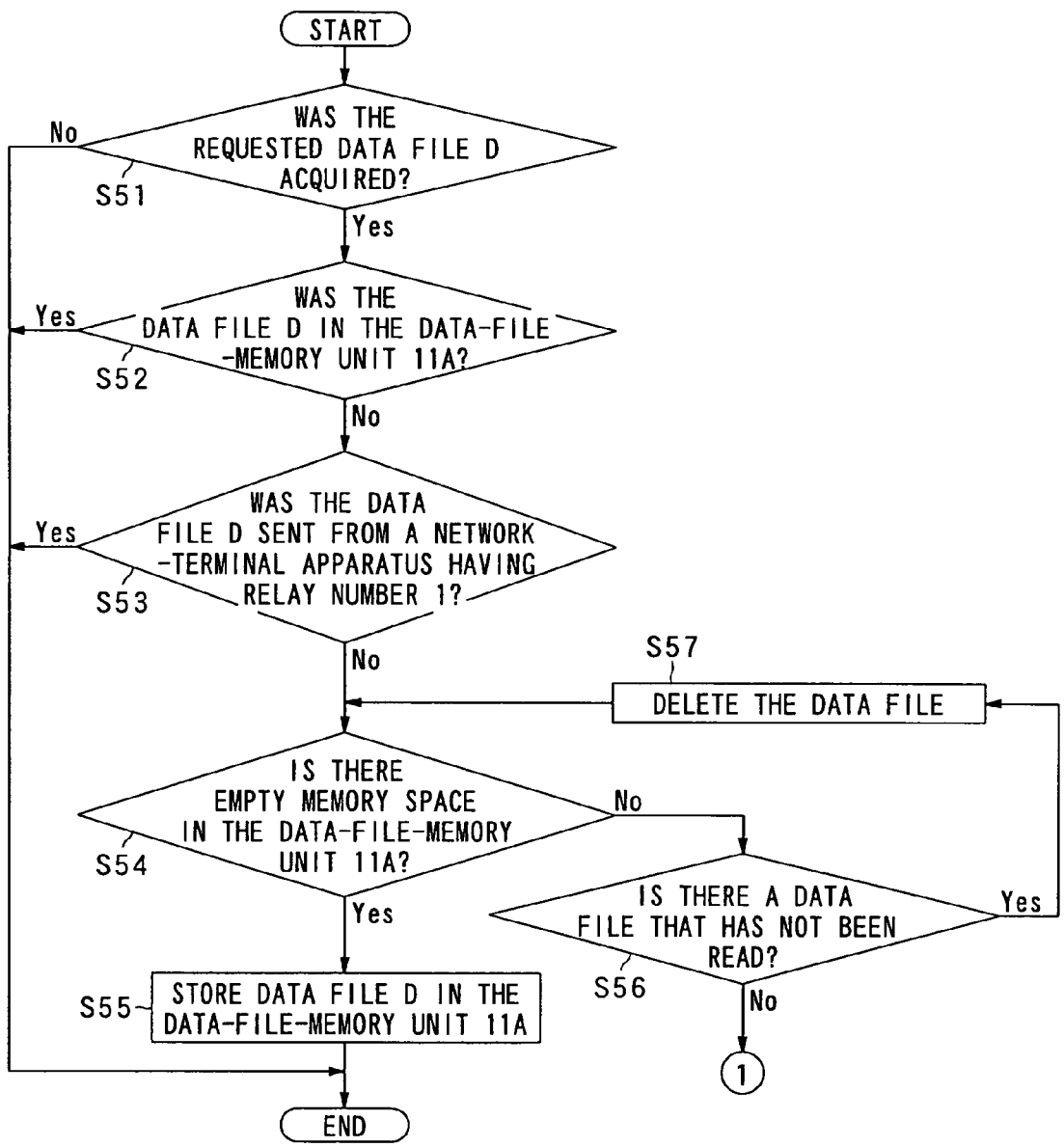
FIG. 9A is a flowchart showing a copying process by the control unit 18 of the network-terminal apparatus 10.
Figure 9B:
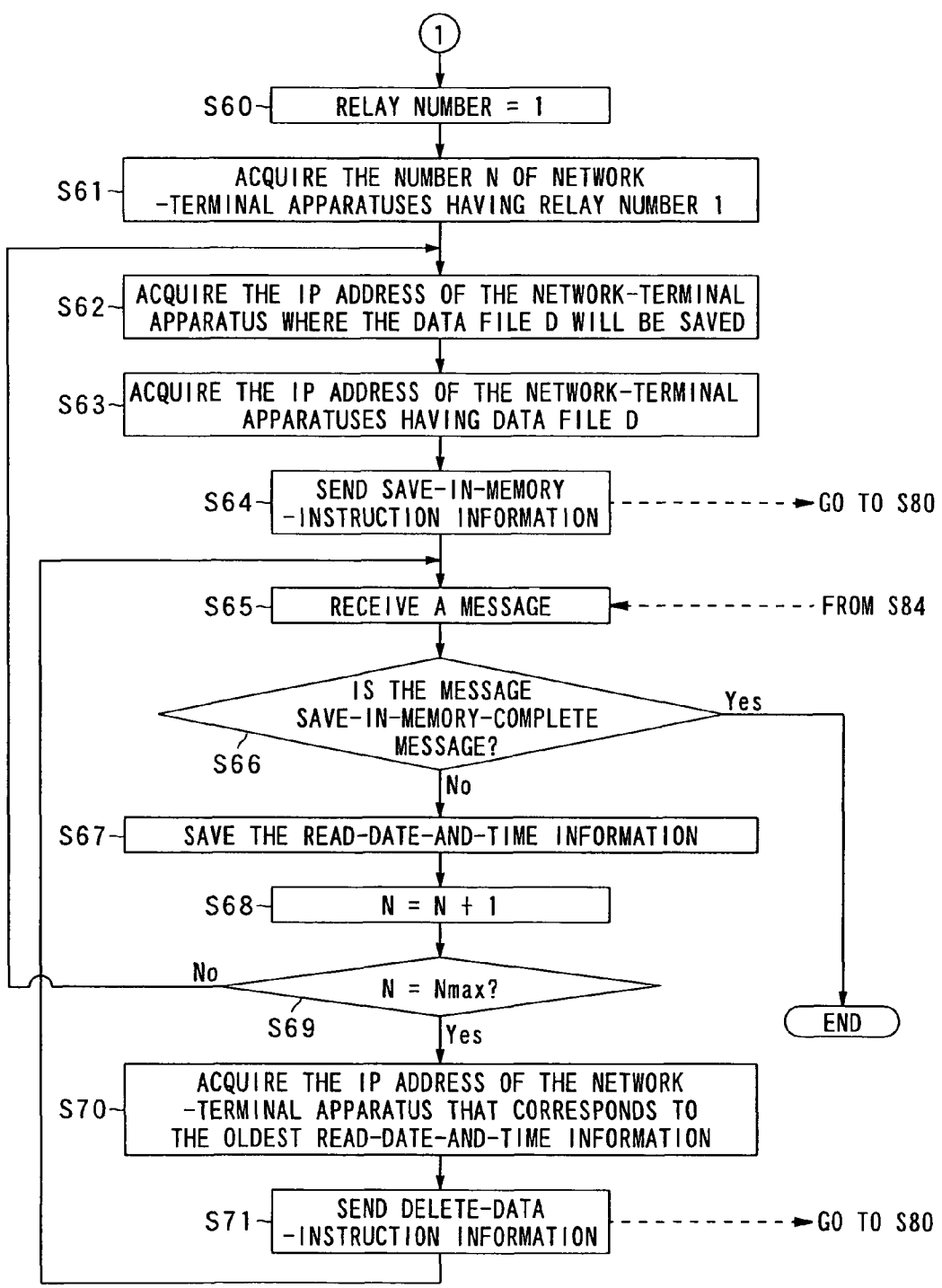
FIG. 9B is a flowchart showing an acquisition process by the control unit 18 of the network-terminal apparatus 10.
Figure 9C:
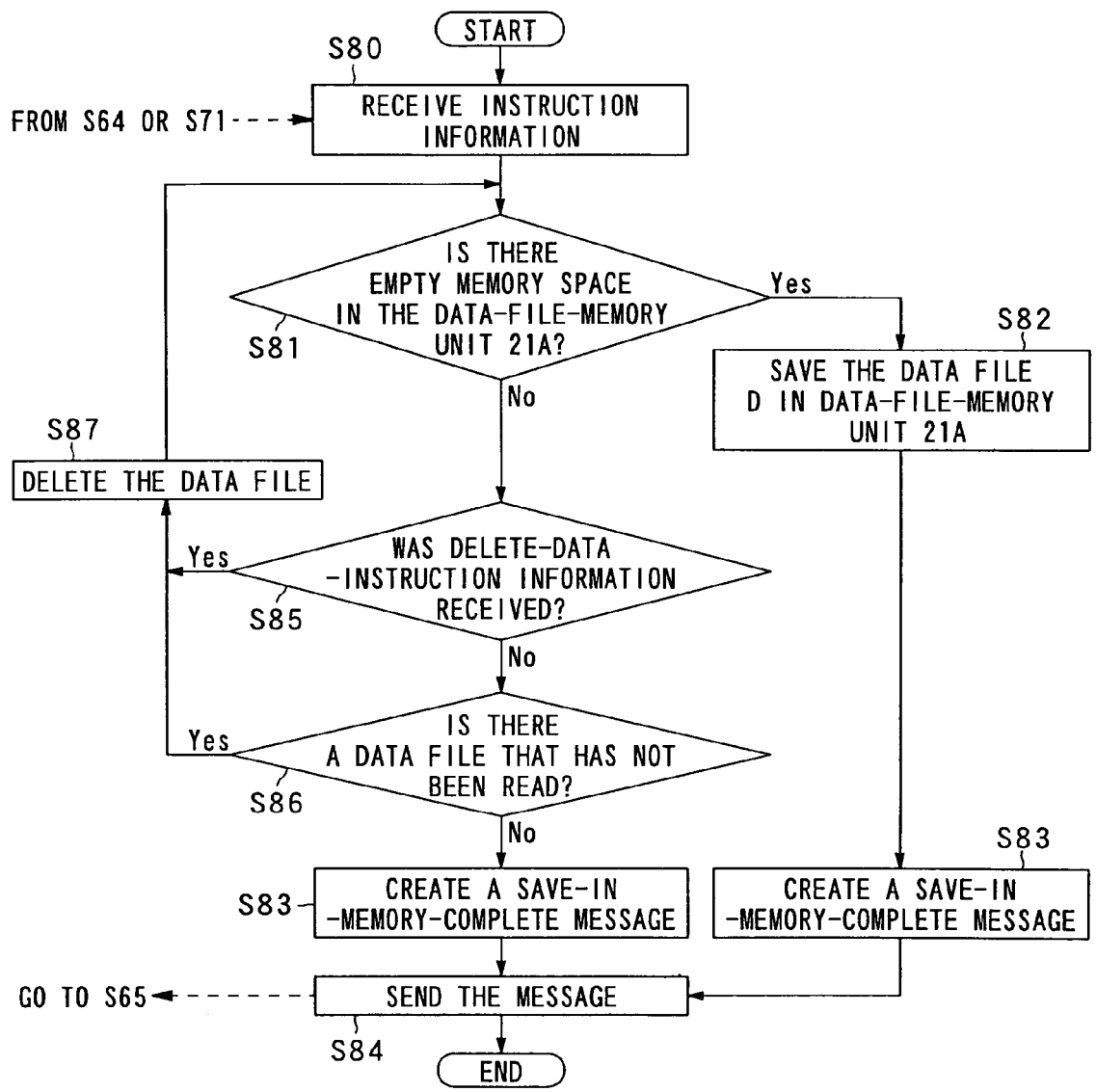
FIG. 9C is a flowchart showing a transmission process by the control unit 28 of the network-terminal apparatus 20.

FIG. 9A and FIG. 9B are flowcharts showing the process of saving a data file D in memory that is performed by the control unit 18 of the network-terminal apparatus 10, and FIG. 9C is a flowchart showing the process of saving a data file D in memory that is performed by the control unit 28 of the network-terminal apparatus 20 that is instructed by the network-terminal apparatus 10 to save the data file D in memory.

The process that is shown in FIG. 9A starts when the data-file-acquisition process described above and shown in the flowcharts of FIG. 5A and FIG. 5B ends.

First, in the data-file-acquisition process described above, the network-terminal apparatus 10 determines whether or not the data file D that was requested by the user was acquired (step S51). When it is determined that the requested data file D has not been acquired (step S51: No), processing ends; and when it is determined that the requested data file D has been acquired (step S51: Yes), the network-terminal apparatus 10 determines whether or not the acquired data file D has been stored in the data-file-memory unit 11A (step S52).

When it is determined that the data file D has been stored in the data-file-memory unit 11A (step S52: Yes), processing ends, however, when it is determined that the data file D has not been stored in the data-file-memory unit 11A (step S52: No), the network-terminal apparatus 10 determines whether or not the acquired data file D has been sent from a network-terminal apparatus for which the number of relays is one (step S53).

Next, when it is determined that the data file D has been sent from a network-terminal apparatus for which the number of relays is one (step S53: Yes), processing ends, however, when it is determined that the data file D has not been sent from a network-terminal apparatus for which the number of relays is one (step S53: No), the network-terminal apparatus 10 determines whether or not there is enough empty storage space in the data-file-memory unit 11A to store the acquired data file D (step S54).

When it is determined that there is enough storage space to store the data file D (step S54: Yes), the data file D is stored in the data-file-memory unit 11A (step S55), and processing ends.

On the other hand, when it is determined that there is not enough storage space to store the data file D (step S54: No), the network-terminal apparatus 10 determines whether or not there is a data file among the data files stored in the data-file-memory unit 11A that has not been read for more than a certain period of time, for example, a data file that has not been accessed for one month or more (step S56).

When there is a data file that has not been read for more than a certain period of time (step S56: Yes), the network-terminal apparatus 10 deletes that data file and returns to the judgment of step S54 (step S57), however, when there is no data file that has not been read for more than a certain period of time (step S56: No), processing moves to the processing shown in the flowchart of FIG. 9B (connector 1).

The data file D is saved in RAM (not shown in the figure) of the control unit 18 for which the number of relays is one (step S60).

Next, the network-terminal apparatus 10 acquires the total number Nmax of network-terminal apparatuses for which the number of relays is one from the network-terminal table for which the number of relays is one in the communication-load table that is stored in the communication-load-table-memory unit 11B, and in order to perform initialization, stores the value N, which represents the number of terminals for which the number of relays is checked as being one as storage candidates, as '0' in the RAM (not shown in the figures) of the control unit 18 (step S61). In other words, in the example of the communication-load table shown in FIG. 4, '4' is acquired as the total number Nmax of network-terminal apparatuses for which the number relays is one.

Also, the apparatus-selection unit 13 arbitrarily selects a network-terminal apparatus from among the network-terminal apparatus for which the number of relays is one as the storage destination for saving the acquired data file D, and acquires the IP address of the selected network-terminal apparatus from the communication-load-table-memory unit 11B (step S62). Here, the network-terminal apparatus that will be the storage destination is selected randomly from among the network-terminal apparatuses for which the number of relays is one according to control from the control unit 18. Here the explanation will continue for the case in which the network-terminal apparatus 20 is selected by the apparatus-selection unit 13, and the IP address [100. 100. 10. 16] of network-terminal apparatus 20 is acquired.

Next, the network-terminal apparatus 10 acquires the IP address of the network-terminal apparatus that sent the data file D in the data-file-acquisition process described above from the communication-load-table-memory unit 11B (step S63).

In other words, in the case in which the data file D is sent from network-terminal apparatus 60 in the data-file-acquisition process, the IP address of network-terminal apparatus 60 is acquired from the network-terminal table for which the number of relays is three that is stored in the communication-load-table-memory unit 11B, and in the case in which the data file D is sent from network-terminal apparatus 80, the IP address of network-terminal apparatus 80 is acquired from the network-terminal table for which the number of relays is four that is stored in the communication-load-table-memory unit 11B.

Also, based on the IP address of network-terminal apparatus 20 that was acquired in step S62, the network-terminal apparatus 10 sends save-instruction information via the communication unit 17 to the network-terminal apparatus 20 giving an instruction to save a copy of the data file D in memory (step S64).

Next, the network-terminal apparatus 10 receives a message from the network-terminal apparatus 20 indicating whether or not the data file D has been saved in memory (step S65). More specifically, when the data file D has not yet been saved in memory, an error message is sent, and when the data file D has been saved in memory, a 'save-complete' message is sent from the network-terminal apparatus 20 and received by the network-terminal apparatus 10 via the communication unit 17.

When this error message is sent, it includes the oldest reading date and time contained in the data-file-memory unit 21A.

Also, the network-terminal apparatus 10 determines whether or not the message received in step S65 is a 'save-complete' message (step S66), and when the message is a 'save-complete' message (step S66: Yes), processing ends; however when the message is not a 'save-complete' message (step S66: No), the received message is determined to be an error message, so date and time information that is included in that received error message is correlated with that network-terminal apparatus and stored in the memory unit 11 (step S67).

Moreover, '1' is added to the value N that is stored in the RAM (not shown in the figures) of the control unit 18 (step S68), and network-terminal apparatus 10 determines whether or not the value N equals the value Nmax that was acquired in step S60 (step S69), and when N equals Nmax (step S69: Yes), network-terminal apparatus 10 acquires the IP address of the network-terminal apparatus corresponding to the oldest reading date and time (step S70), and sends delete-data-instruction information to the network-terminal apparatus corresponding to that IP address, network-terminal apparatus 20 for example (step S71). On the other hand, when the value N is determined not to equal the value Nmax (step S69: No), processing returns to step S62.

In the processing shown in FIG. 9C, the network-terminal apparatus 20 receives the 'save-instruction' information that was sent in step S64, or receives the 'delete-data-instruction' information that was sent in step S71 (step S80). Also, network-terminal apparatus 20 determines whether or not there is empty memory space in its data-file-memory unit 21A (step S81), and when there is empty memory space (step S81: Yes), the network-terminal apparatus 20 saves the data file D in the data-file-memory unit 21A (step S82), then creates a 'save-complete' message (step S83) and sends that message to the network-terminal apparatus 10 (step S84). That message is the message received in step S65 described above.

On the other hand, when it is determined in step S81 that there is no empty memory space (step S81: No), the network-terminal apparatus 20 determines whether or not it received 'delete-data-instruction' information (step S85), and when it received that information (step S85: Yes), deletes the data file D (step S87) and returns to step S81. On the other hand, when network-terminal apparatus 20 did not receive 'delete-data-instruction' information (step S85: No), it determines whether or not there is a data file stored that has not been read for a specified period of time (step S86), and when there is such a data file (step S86: Yes), moves to step S87 and deletes that data file.

However, when there is no data file that has not been read for a specified period (step S86: No), the network-terminal apparatus 20 creates an error message indicating that (step S83) and sends that message to the network-terminal apparatus 10 (step S84) and ends processing.

In the embodiment described above, the communication loads of each of the communication paths between one network-terminal apparatus and each of the other network-terminal apparatuses in the computer-network system are compared, and based on the comparison results, that network-terminal apparatus acquires data from one of the other network-terminal apparatuses that has a requested data file and that is connected via a communication path having a relatively small communication load (for example has a small number of relays, or in other words, a close distance on the network), so it is possible to reduce the amount of load (access) that is concentrated in a communication path (for example a certain IP router or the like) upstream in the network, and thus it is possible to improve the operating efficiency of the system.

Moreover, a data file that is acquired from a network-terminal apparatus that is connected via a communication path having a communication load that is larger than a certain specified communication load (for example, large number of relays, or in other words, a far distance on the network) is saved at a location where the communication load is smallest and data is readily acquired (for example, saved inside the requesting network-terminal apparatus itself, or inside a network-terminal apparatus that is close on the network to the requesting network-terminal apparatus itself), so it is possible to reduce the amount of load (access) that is concentrated in a communication path (for example a certain IP router or the like) upstream in the network.

In the embodiment described above, construction can be such that when there are many network-terminal apparatuses for which the number of relays is one, it is also possible to limit the number of network-terminal apparatuses among these network-terminal apparatuses for which the number of relays is one in which data can be saved, and to send 'save-instruction' information to only those network-terminal apparatuses for saving data.

Furthermore, in the embodiment described above, topology information about all of the network-terminal apparatuses in a network X is acquired and a communication-load table is created, however, the invention is not limited to this, and construction can also be such that topology information about network-terminal apparatuses that are separated only by a specified number of relays is acquired, and that specified number of relays is taken to be Tmax. For example, by taking the specified number of relays to be 30, it is possible to apply the invention to network-terminal apparatuses in major countries via a network X.

The present invention is not confined to the configuration listed in the foregoing embodiments, but it is easily understood that the person skilled in the art can modify such configurations into various other modes, within the scope of the present invention described in the claims. The entire disclosures of Japanese Patent Applications No. 2004-201720 filed on Jul. 8, 2004 including the specification, claims, drawings and summary are incorporated herein by reference in its entirety.

What is claimed is:

1. A processing apparatus in a network system, which comprises a plurality of processing apparatuses that are connected together via communication paths and in which data is stored in said plurality of processing apparatuses, comprising:

a communication-load-information-acquisition unit configured to acquire communication-load information related to said communication loads of each of said communication paths between said one processing apparatus and each of said other processing apparatuses;

a communication-load-comparison unit configured to compare said communication loads of said communication paths, wherein said communication loads for said communication paths are determined based on at least one of a number of relay apparatuses in said communication path, a length of delay time in said communication path and an effective bandwidth of said communication path;

a request-information-transmission unit that, based on said comparison results by said communication-load-comparison unit, sends request information to one of said other processing apparatuses, which is connected by one of said communication paths for which said communication load is relatively the one of said other apparatuses storing said data, and said request information being indicative of a request that said data be sent;

a data-reception unit that receives said data that is sent from said other processing apparatus, a data-memory unit that saves data in memory;

a memory-space-availability-determination unit configured to determine whether said data-memory unit comprises the necessary amount of empty memory space for saving said data in memory when said data is sent from a first said other processing apparatus that is connected via a communication path having a communication load that is greater than a specified communication load, wherein said data is received by said data-reception unit, and wherein said data has not already been saved in memory by said data-memory unit; and a data-memory-control unit that saves said data in an appropriate memory space in response to determining that there is said empty memory space by said memory-space-availability-determination unit.

2. The processing apparatus of claim 1 further comprising:

a data-memory-control unit configured to secure said necessary empty memory space in said data-memory unit when said memory-space-availability-determination unit determines there is not said empty memory space, and save said data in prepared memory space.

3. The processing apparatus of claim 2 comprising:

a determination unit configured to determine whether or not there is data in said data-memory unit that has not been read for more than a certain specified period of time when said memory-space-availability-determination unit determines that there is not said empty memory space; and wherein said data-memory-control unit deletes data when said determination unit determines that there is data in said data-memory unit that has not been read for more than a certain specified period of time, and prepares and maintains said necessary empty memory space, then saves said data in that prepared memory space.

4. The processing apparatus of claim 1 further comprising:

a save-in-memory-instruction-information-transmission unit that sends save-in-memory-instruction information, which gives an instruction to save said data that is saved in said first other processing apparatus, to a second other processing apparatus that is connected via a communication path that has a communication load that is less than said specified communication load when said memory-space-availability-determination unit determined that there is not said necessary empty memory space.

5. The processing apparatus of claim 4 further comprising:

a save-in-memory-not-possible-information-reception unit that receives save-in-memory-not-possible information that is sent from said second other processing apparatus and that indicates that said data cannot be saved in memory; and wherein when said save-in-memory-not-possible information is received, said save-in-memory-instruction-information-transmission unit sends said save-in-memory-instruction information to a third other processing apparatus that is connected via a communication path having the smallest communication load next to said communication load of said communication path with said second other processing apparatus that sent said save-in-memory-not-possible information.

6. The processing apparatus of claim 5 wherein said save-in-memory-instruction-information-transmission means sends said save-in-memory-instruction information to said other processing apparatus that is connected via a communication path that has a communication load that is less than a specified communication load in the order of smallest communication load until there is another processing apparatus that is capable of saving said data in memory.

7. The processing apparatus of claim 6 comprising:

a delete-data-instruction-information-output unit that sends delete-data-instruction information to the processing apparatus from among all of the processing apparatuses having a communication load that is less than a specified communication load that has the oldest data that has not been read for the longest period of time giving an instruction to delete that oldest data, when said save-in-memory-not-possible information is received from all of said other processing apparatuses that are connected via communication paths having communication loads that are less than a specified communication load.

8. The processing apparatus of claim 1 further comprising:

a transmission-not-possible-information-reception unit that receives transmission-not-possible information that is sent from said other processing apparatus and indicates that it is not possible to send said data; and wherein when said transmission-not-possible information is received, said request-information-transmission unit sends said request information to said other processing apparatus that is connected via said communication path having a communication load that is next smallest to said communication load of said communication path of said other processing apparatus that sent said transmission-not-possible information.

9. The processing apparatus of claim 1 wherein weightings are respectively given to the number of said relay apparatuses, length of said delay time and said effective bandwidth, and where the weighting given to the number of said relay apparatuses is the largest.

10. The processing apparatus of claim 1 wherein said request-information-transmission unit sends said request information only when said data is not saved in the memory of that processing apparatus.

11. The processing apparatus of the claim 1 further comprising an information-reproduction unit to reproduce said data.

12. A processing apparatus, which is said other processing apparatus that receives said request information from said one processing apparatus of claim 1, comprising:

a data-memory unit that saves data in memory;

a data-saved-in-memory-determination unit configured to determine whether or not said data that corresponds to said transmission request indicated in said received request information is saved in memory of said data-memory unit; and a data-transmission configured to read said data from said data-memory unit and send said data to said one processing apparatus when said data-saved-in-memory-determination unit determines that said data is saved in memory.

13. A processing apparatus, which is said other processing apparatus that receives said request information from said one processing apparatus of claim 1, comprising:

a data-memory unit that saves data in memory;

a data-saved-in-memory-determination unit configured to determine whether or not said data that corresponds to said transmission request indicated in said received request information is saved in memory of said data-memory unit;

a data-transmission-capability-determination unit configured to determine whether or not it is possible to send said data to said one processing apparatus when said data-saved-in-memory-determination unit has determined that said data is saved in memory; and a data-transmission unit configured to read said data from said data-memory unit and send said data to one processing apparatus when said data-transmission-capability-determination unit determines that it is possible to send said data.

14. The processing apparatus of claim 12 further comprising:
- a transmission-not-possible-information-transmission unit that sends transmission-not-possible information to said one processing apparatus indicating that it is not possible to send said data when said data-saved-in-memory-determination unit determines that said data is not saved in memory, or when said data-transmission-capability-determination unit determines that it is not possible to send said data.

15. A processing apparatus which is said other processing apparatus that receives said save-in-memory-instruction information from said one processing apparatus of claim 4, comprising:
- a data-memory unit that saves data in memory;
- a memory-space-availability-determination unit configured to determine whether or not there is the necessary empty memory space in said data-memory unit that saves said data that was indicated in said save-in-memory-instruction information; and
- a data-memory-control unit configured to acquire said data that is saved in the memory in said processing apparatus from said first other processing apparatus and saving that data in said memory space of said data-memory unit when said memory-space-availability-determination unit determines that there is said empty memory space.

16. The processing apparatus of claim 15 further comprising:
- a data-memory-control unit configured to secure said necessary empty memory space in said data-memory unit, acquire said data that is saved in the memory in said processing apparatus from said first other processing apparatus and save that data in said prepared memory space of said data-memory unit when said memory-space-availability-determination unit has determined that there is not said empty memory space.

17. The processing apparatus of claim 15 further comprising:
- a save-in-memory-not-possible-information-transmission unit that sends save-in-memory-not-possible information to said one processing apparatus indicating that it is not possible to save said data when said memory-space-availability-determination unit has determined that there is not said empty memory space.

18. The processing apparatus of claim 15 further comprising:
- a save-in-memory-not-possible-information-transmission unit that sends save-in-memory-not possible information to said one processing apparatus indicating that said data cannot be saved in memory when said memory-space-availability-determination unit has determined that there is no said empty memory space, and can not secure said necessary empty memory space in said data-memory unit.

19. A processing apparatus, which is said other processing apparatus that receives said delete-data-instruction information from said one processing apparatus of claim 7, comprising:
- a data-memory-control unit configured to delete the oldest data from the data-memory unit that has not been read for the longest period of time, and save said data in that memory space when said delete-data-instruction information is received.

20. A processing method in a network system, which comprises a plurality of processing apparatuses that are connected together via communication paths and in which data stored in said plurality of processing apparatuses, the method comprising steps of:
- acquiring communication-load information related to the communication loads of said communication paths between said one processing apparatus and of said other processing apparatuses;
- comparing the communication loads of said communication paths, wherein said communication loads for said communication paths are determined based on at least one of a number of relay apparatuses in said communication path, a length of delay time in said communication path and an effective bandwidth of said communication path;
- sending request information, based on the comparison of the communication loads, to one of said other processing apparatuses, which is connected by one of said communication paths for which said communication load is relatively the one of said other apparatuses storing said data, and the request information being indicative of requesting that said data be sent;
- receiving said data that is sent from said other processing apparatus;
- saving data in memory;
- determining whether said memory comprises the necessary amount of empty memory space for saving said data in memory when said data is sent from a first said other processing apparatus that is connected via a communication path having a communication load that is greater than a specified communication load, wherein said data is received and wherein said data has not already been saved in memory; and
- saving said data in appropriate memory space in response to determining that there is said empty memory space.

21. A non-transitory computer readable storage medium recording a processing program to be performed in a processing apparatus in a network system, which comprises a plurality of processing apparatuses that are connected together via communication paths and in which data is stored in said plurality of processing apparatuses, the processing program causing a computer of the processing apparatus to execute steps of:
- acquiring communication-load information related to the communication loads of said communication paths between said one processing apparatus and said other processing apparatuses;
- comparing the communication loads of said communication paths, wherein said communication loads for said communication paths are determined based on at least one of a number of relay apparatus in said communication path, a length of delay time in said communication path and an effective bandwidth of said communication path;
- sending request information, based on the comparison of the communication loads, to one of said other processing apparatuses, which is connected by one of said communication paths for which said communication load is relatively the one of said other apparatuses storing said data, and the request information being indicative of requesting that said data be sent;
- receiving said data that is sent from said other processing apparatus;

saving data in memory;

determining whether said memory comprises the necessary amount of empty memory space for saving said data in memory when said data is sent from a first said other processing apparatus that is connected via a communication path having a communication load that is greater than a specified communication load, wherein said data is received and wherein said data has not already been saved in memory; and saving said data in an appropriate memory space in response to determining that there is said empty memory space.

* * * * *